United States Patent Office 3,203,993
Patented Aug. 31, 1965

3,203,993
p-(AMINOALKYL)BENZYLAMINES
John G. Abramo, Wilmington, Del., and Earl C. Chapin, Springfield, Mass., assignors to Monsanto Company, a corporation of Delaware
No Drawing. Filed June 17, 1963, Ser. No. 288,430
4 Claims. (Cl. 260—570.8)

The present application is a continuation in part of our copending applications Serial No. 782,668, filed December 24, 1958, and now abandoned, Serial No. 813,637, filed May 18, 1959, and now abandoned, and Serial No. 12, filed January 4, 1960, and now abandoned.

The present invention relates to p-(aminoalkyl)benzylamines having the structures:

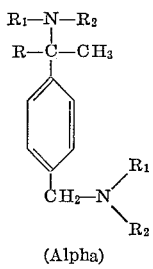
(Alpha)

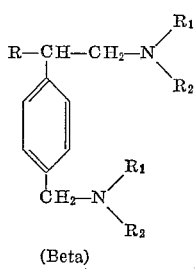
(Beta)

wherein R is selected from the class consisting of hydrogen and methyl radical, $R_1$ is selected from the class consisting of hydrogen, alkyl radicals and aryl radicals and $R_2$ is selected from the class consisting of alkyl radicals and aryl radicals.

Compounds containing difunctional groups, and particularly those whose functionality is in the form of secondary amino groups, can be subjected to condensation-type reactions with polybasic acids to provide polymeric materials, more specifically polyamides, which when extruded and oriented by stretching and the like, produce useful fibers and films. When the secondary and tertiary diamines of the present invention are subjected to condensation of the type outlined above, the fibers and films which result exhibit particularly attractive properties. This can presumably be attributed to the fact that the featured diamines are symmetrical in the placement of the functional substituents on the benzene ring, being in para position, while nevertheless being unsymmetrical as to the constituency of these substituents.

Accordingly, it is the principal object of this invention to produce secondary and tertiary p-(aminoalkyl)benzylamines.

Other objects of the invention will in part be obvious and will in part appear hereinafter.

These and other objects of the invention are attained by providing secondary and tertiary p-(aminoalkyl)-benzylamines having the structures:

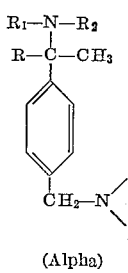
(Alpha)

and

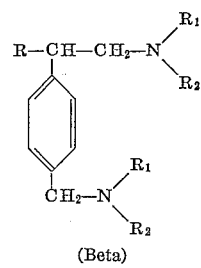
(Beta)

wherein R is selected from the class consisting of hydrogen and methyl radical, $R_1$ is selected from the class consisting of hydrogen, alkyl radicals and aryl radicals and $R_2$ is selected from the class consisting of alkyl radicals and aryl radicals.

The following examples are given in illustration of the invention. Where parts are mentioned, parts by weight are intended unless otherwise indicated.

Example I

About 30 grams of p-(alpha-chloroethyl)benzyl chloride is added to a solution of 200 grams of methylamine in 200 ml. of methanol. This solution is transferred to an autoclave chilled to 0° C. The autoclave is closed and heated at 50° C. for 10 hours. Thereafter the autoclave is cooled to room temperature and the unreacted methylamine is allowed to pass off. The reaction mixture is filtered to remove methyl ammonium chloride which is formed in the reaction. The excess methanol is removed by evaporation and the remaining material is distilled under vacuum. The material distilling at 110°–116° C./0.4 mm. Hg is collected and analyzed. The analytical values for carbon, hydrogen and nitrogen, and the observed value for neutralization equivalent correspond to the calculated value for N-methyl-p-[(alpha-(N-methyl)aminoisopropyl)]benzylamine.

Example II

Fifty-seven grams of p-(alpha-chloroethyl)benzyl chloride is added to a solution of 242 grams of aniline, 60 grams of sodium bicarbonate in 100 ml. of water, being maintained under reflux with vigorous stirring. Stirring and heating of the resulting reaction mixture is continued for 4 hours. About 200 ml. of ethyl ether is then added to the reaction mixture and the upper organic layer is isolated using a separatory funnel. The ether solution is washed with three 175 ml. portions of salt water and dried with potassium carbonate for 16 hours. The ether solution is evaporated and the resulting solid is crystallized from hexane solvent as a light tan-colored crystalline material. When analyzed, this crystalline material yields values calculated for N-phenyl-p-[(alpha-(N-phenyl)ethyl)]benzylamine.

Example III

Over a period of 4 hours, 50 grams of p-(beta-chloroisopropyl)benzyl chloride is added to a solution of 200 grams of methylamine in 500 ml. of methanol maintained at ice temperature. The reaction mixture is transferred to a 1-liter autoclave cooled to ice temperature. The autoclave is closed and heated to 150° C. with stirring for a period of 20 hours. The autoclave is then allowed to cool to room temperature and excess methylamine is vented. The reaction mixture is then concentrated on a steam bath until methyl ammonium chloride begins to precipitate. The reaction mixture is then cooled and diluted with 200 ml. of tetrahydrofuran whereupon the major portion of the methyl ammonium chloride is removed by filtration. The clear solution which results is subjected to distillation at atmospheric pressure to remove the solvent and the product is distilled at reduced pressure of 1 mm. Hg.

Infrared and elemental analysis establishes the product as N-methyl-p-[(beta-(N-methyl)aminoisopropyl)]benzylamine.

The secondary and tertiary p-(aminoalkyl)benzylamines of the present invention have the structures:

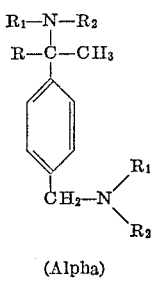

(Alpha)

and

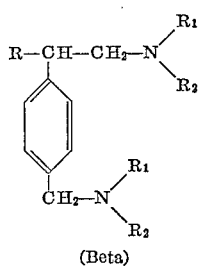

(Beta)

wherein R is selected from the class consisting of hydrogen and methyl radical, $R_1$ is selected from the class consisting of hydrogen, alkyl radicals, and aryl radicals and $R_2$ is selected from the class consisting of alkyl radicals and aryl radicals.

As indicated by the structural formula above, the secondary diamines can contain in addition to a hydrogen on an amino group or groups, alkyl, aryl and aralkyl radicals or substituents; while the teritary diamines are exclusive of hydrogen on an amino group or groups. Because the subject compounds are diamines and so contain two amino groups, variation between the groups can be had, to contribute diamines having mixed amino groups. When an alkyl radical is included or substituted on an amino group, it is preferred that the alkyl radical be selected from those containing 1–10 carbon atoms in the longest continuous chain thereof; e.g., methyl, ethyl, butyl, isobutyl, hexyl, isooctyl and decyl. When an aryl radical is substituted, those containing 6–20 carbon atoms in their basic cyclic structure are preferred; e.g., phenyl, naphthyl, anthryl, biphenyl and acenaphthyl. Illustrative of the subject diamines are the following:

N-methyl-p-[(beta-(N-methyl)aminoethyl)]benzylamines;
N-phenyl-p-[(alpha-(N-phenyl)aminoethyl)]benzylamines;
N-phenyl-p-[(beta-(N-phenyl)aminoethyl)]benzylamines;
N-methyl-p-[(alpha-(N-phenyl)aminoethyl)]benzylamines;
N-methyl-p-[(beta-(N-phenyl)aminoethyl)]benzylamines
N-phenyl-p-[(alpha-(N-methyl)ethylamine)]benzylamines;
N-phenyl-p-[(beta-(N-methyl)ethylamine)]benzylamines;
N-butyl-p-[(alpha-(N-butyl)aminoethyl)]benzylamines;
N-methyl-p-[(alpha-(N,N-dimethyl)aminoethyl)]benzylamines;
N-methyl-p-[(beta-(N,N-dimethyl)aminoethyl)]benzylamines;
N,N-dimethyl-p-[(alpha-(N-methyl)aminoethyl)]benzylamines;
N,N-dimethyl-p-[(beta-(N-methyl)aminoethyl)]benzylamines;
N,N-diphenyl-p-[(alpha-(N-phenyl)aminoethyl)benzylamines;
N,N-diphenyl-p-[(beta-(N-phenyl)aminoethyl)]benzylamines;
N,N-diphenyl-p-[(alpha-(N-methyl)aminoethyl)]benzylamines;
N,N-diphenyl-p-[(beta-(N-methyl)aminoethyl)]benzylamines;
N-butyl-p-[(alpha-(N,N-dimethyl)aminoethyl)]benzylamines;
also N-methyl-p-[(alpha-(N-methyl)aminoisopropyl)benzylamines;
N-methyl-p-[(beta-(N-methyl)aminoisopropyl)]benzylamines;
N-phenyl-p-[(alpha-(N-phenyl)aminoisopropyl)]benzylamines;
N-phenyl-p-[(beta-(N-phenyl)aminoisopropyl)]benzylamines and the like.

Additional diamine compounds can result from inclusion of other or secondary nuclear substituents on the benzene ring. The latter can include the halogens and alkyl radicals such as methyl, ethyl and the like.

The p-(aminoalkyl)benzylamines of the present invention can be obtained by reacting an amine selected from the class consisting of alkyl and aryl substituted primary amines, alkyl and aryl substituted secondary amines and mixtures of the same with a p-(haloalkyl)benzyl halide having the structures:

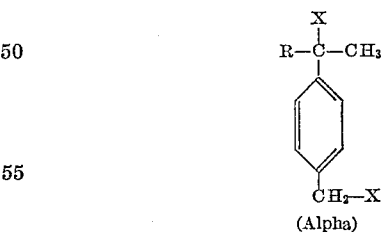

(Alpha)

and

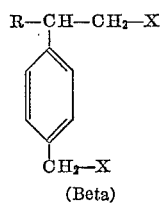

(Beta)

wherein R is selected from the class consisting of hydrogen and methyl radical and X is a halogen.

The p-(haloalkyl)benzyl halide starting compounds can in turn be obtained through the halomethylation of the corresponding (haloalkyl)benzene. Illustrative of this: a benzene compound having an alkyl substituent corresponding to that which is to eventuate as the aminoalkyl primary substituent (either ethyl or isopropyl) is halomethylated to provide the corresponding p-(alkyl)benzyl halide. This is in turn monohalogenated to provide a halogen in the alpha or beta position on the alkyl substituent. In a specific instance, ethyl benzene is chloromethylated to produce p-(ethyl)benzyl chloride. This is then monochlorinated to produce the p-(alpha-haloethyl)benzyl chloride or the p-(beta-haloethyl)benzyl chloride which serves as a starting material from which to produce the p-(alpha-aminoethyl)benzylamines and p-(beta-aminoethyl)benzylamines. Regarding the dihalo starting materials, the halogen can be fluorine, chlorine, or bromine with preference directed to those containing chlorine in both positions.

When it is desired to produce a diamine exhibiting identical functionality on both amino groups, whether they be secondary, or tertiary, the p-(haloalkyl)benzylhalide starting material is reacted with in excess of 2 equivalents of a primary amine or secondary amine respectively. The reaction is preferably carried out under elevated temperatures. Illustrative of this: p-(alpha-chloroethyl)benzyl cloride and p-(beta-chloroethyl)benzyl chloride can be reacted with in excess of 2 equivalents of methylamine to obtain N-methyl-p-(alpha-N-methylaminoethyl)benzylamine and N-methyl-p-(beta-N-methylaminoethyl)benzylamine respectively; and p-(alpha-chloroethyl)benzyl chloride and p-(beta-chloroethyl)benzyl chloride can be reacted with in excess of 2 equivalents of dimethylamine to produce N,N'-dimethyl-p-(alpha-N,N'-dimethylaminoethyl)benzylamine and N,N'-dimethyl-p-(beta-N,N'-dimethylaminoethyl)benzylamine respectively. The reaction can be carried out at temperatures ranging 0°–150° C. and pressures ranging 1–20 atmospheres.

The secondary and tertiary p-(aminoalkyl)-aromatic-methylamines of the present invention can be subjected to condensation-type reactions with polybasic acids such as adipic acid and terephthalic acid to provide products which can be molded or otherwise formed to produce useful fibers and films.

It will thus be seen that the objects set forth above among those made apparent from the preceding description are efficiently attained, and since certain changes may be made in carrying out the above process and the diamine products which result without departing from the scope of the invention, it is intended that all material contained in the above description shall be interpreted as illustrative and not in a limiting sense.

What is claimed is:

1. A p-(aminoalkyl)benzylamine selected from the group consisting of:

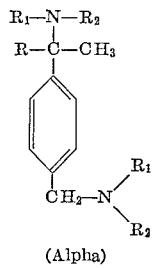
(Alpha)

and

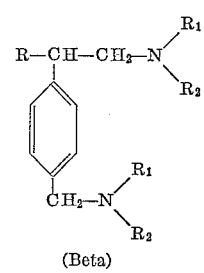
(Beta)

wherein, in each of the above formulae, R is selected from the class consisting of hydrogen and methyl, $R_1$ is selected from the class consisting of hydrogen, alkyls of from 1 to 10 carbon atoms in the longest continuous chain and aryls of from 6 to 20 carbon atoms in their basic cyclic structure, and $R_2$ is selected from the class consisting of alkyl radicals and aryl radicals.

2. N-methyl - p-[(alpha - (N-methyl)aminoisopropyl)] benzylamine.

3. N-methyl-p-[(beta-(N-methyl)aminoisopropyl)]benzylamine.

4. N-phenyl-p-[(alpha-(N-phenyl)ethyl)]benzylamine.

References Cited by the Examiner
UNITED STATES PATENTS 2,464,692 3/49 Kirk et al. _____ 260—570.8
2,685,573 8/54 Wittbecker et al. _ 260—570.8 XR
2,790,830 4/57 Bader _____ 260—570.9 XR

OTHER REFERENCES

Klages et al.: "Chemical Abstracts," vol. 43, pages 5385–6 (1949).

CHARLES B. PARKER, Primary Examiner.